United States Patent [19]

Mayes et al.

[11] Patent Number: 5,637,281
[45] Date of Patent: Jun. 10, 1997

[54] PROCESS FOR THE REMOVAL OF FROM OXIDE COATINGS IRON ZIRCONIFEROUS MATERIAL

[75] Inventors: Keith P. Mayes, Eneabba; Douglas W. Selby, Leeman; Steven K. Gilman, Eneabba, all of Australia

[73] Assignee: RGC Mineral Sands, Ltd., Australia

[21] Appl. No.: 398,593

[22] Filed: Mar. 3, 1995

[30] Foreign Application Priority Data

Mar. 4, 1994 [AU] Australia .................. PM4250

[51] Int. Cl.$^6$ ................ C01G 25/00; C01G 49/00
[52] U.S. Cl. .................... 423/86; 423/150.1
[58] Field of Search ............... 423/86, 150.1, 423/82

[56] References Cited

U.S. PATENT DOCUMENTS

| 4,361,542 | 11/1982 | Arendt | 423/86 |
| 4,395,384 | 7/1983 | Poynton | 423/86 |
| 4,711,664 | 12/1987 | Kwon et al. | 423/76 |

FOREIGN PATENT DOCUMENTS

| 498667 | 3/1979 | Australia | 423/86 |
| 5-116946 | 5/1993 | Japan. | |
| 429998 | 6/1935 | United Kingdom. | |

*Primary Examiner*—Steven Bos
*Attorney, Agent, or Firm*—Harness, Dickey & Pierce, P.L.C.

[57] ABSTRACT

A process is disclosed for the removal of iron oxide coatings from zirconiferous material including a first step of heat treating the zirconiferous material at a temperature, not greater than 450° C. and for a period sufficient to activate the coatings for enhanced ease of removal. The product of the first step is thereafter subjected to a leach and/or attritioning treatment.

24 Claims, 4 Drawing Sheets

PROCESS FOR THE REMOVAL OF FROM OXIDE COATINGS IRON ZIRCONIFEROUS MATERIAL

BACKGROUND OF THE INVENTION

This invention relates to a process for the removal of iron contamination from zirconiferous materials, particularly the removal of iron oxide coatings from zircon grains. It is to be understood that the terms "iron oxide coatings" and "iron oxide", used herein include iron oxide and/or iron hydroxides and/or compounds of both iron oxide and/or iron hydroxides and in both amorphous and crystalline forms. It will also be understood that this specification adopts the convention of expressing iron oxide content as equivalent $Fe_2O_3$ content by weight.

Zircon ($ZrSiO_4$) is a major component of most so-called "mineral sands" or "heavy mineral" deposits along with titanium-bearing minerals ilmenite and rutile as well as small amounts of other minerals such as monazite. Zircon finds major uses in foundries, refractories, abrasives and ceramic glazes and enamels.

Zircon is extracted from mineral sands deposits by mining followed by wet concentration to remove coarse and fine sands and slimes to produce a heavy mineral concentrate. The concentrate is subjected to various combinations of gravity separation, magnetic separation and electrostatic separation to yield separate streams of zircon, ilmenite, rutile and monazite.

Depending largely on the particular mineral sands orebody or section of the orebody and to a minor extent on the methods of concentrate separation employed, the zircon grains are coated to varying degrees with iron oxide(s). In many instances, the iron oxide contamination is such that the zircon is unsuitable for certain end-use applications, especially where colour is a criterion, for example for use in ceramic glazes and enamels. Such "ceramic grade zircon" must typically contain a maximum of 0.07% by weight iron oxides expressed as $Fe_2O_3$.

DESCRIPTION OF THE PRIOR ART

It is known in the art that iron oxide coatings on heavy minerals may be reduced by attritioning, with or without reagents including acids. However, such attritioning is limited in its effect to reduce iron oxide coatings below certain levels. Depending on the orebody, or section of the orebody, the attritioned zircon frequently remains unsuitable for use in ceramic grade applications.

A number of processes for the removal or partial removal of iron oxide coatings from zircon have been proposed. The so-called Hot Acid Leach (HAL) process, involves treatment with a concentrated sulphuric acid as a paste in a kiln at about 100° C., followed by transfer to water in a dissolving tank. The HAL process achieves ceramic grade zircon but requires a substantial initial capital investment. A variation of the HAL process is disclosed in Australian patent no. 498667, which is concerned with the removal of surface coatings from mineral sands prior to their separation into individual streams. In the preferred embodiment described in this patent, the material is heated and maintained at temperatures in the range of 50° C. to 130° C. in the presence of an acid (eg 25% to 98% $H_2SO_4$) with or without surface-coating acting reagents (eg oxalic acid), washed, dewatered, dried and then calcined at temperatures, between 150° C. and 600° C. but preferably 300° C. to 500° C., to cause decomposition of the surface coatings on the grains.

Australian Patent No. 515456 discloses a process wherein the zircon grains are first coated with a strong basic reagent, eg sodium hydroxide, then calcined at a temperature of at least 600° C. (preferably 750° C. to 800° C.) for a period not less than and preferably 20 minutes and finally washed with water or dilute acid. When the process is carried out in a gas-fired kiln, the mechanism involves initial conversion of sodium hydroxide to sodium carbonate via the kiln gases. An iron carbonate complex is formed and reacts chemically with the acid, removal of the coatings also being aided by vigorous evolution of $CO_2$ gas produced by the acid/carbonate reaction.

A comparison of the processes of patents 498667 and 515456 is to be found in Brennan et al, International Journal of Mineral Processing, 13 (1984), pp 251–258. This paper proposes a further variation of the process of patent 498607 in which the zircon is first calcined at 600° C., then digested with strong acid at 100° C. for one hour, using a tumbling sand/reagent mixture.

Another proposal, utilising a basic reagent, is described in the present applicant's prior Australian patent application 14983/92. This process involves a treatment with a strong alkali solution, preferably caustic soda, at about 75° C. followed by a water wash and then an acid leach at about 90° C. The process has been found to be insufficiently effective at economic concentrations of the respective reagents.

A disadvantage of known processes for the removal of iron-oxide coatings from zircon is their cost, in both capital and operating terms. In order for the product to be price competitive, the process costs need to be relatively low.

SUMMARY OF THE INVENTION

An object of the invention is to provide a process which sufficiently removes iron oxide coatings from zirconiferous material to produce ceramic grade zircon, and involves relatively low capital and operating costs, yet is at least as effective as known processes.

A feature common to prior-art processes (other than simple attritioning, as earlier mentioned) is the chemical (eg acids or alkalis) treatment of zircon, at ambient or elevated temperatures prior to or during calcination in order to activate the iron oxide coatings. As used herein, and generally in the art, the terms "calcination" and "calcine" refer generally to heat treatment of the zirconiferous material for a period at an elevated temperature. It has been found, in accordance with the present invention that such prior chemical treatment is not required when the calcination, ie heat treatment, step is carried out within a certain and relatively low temperature range and for a certain relatively short period of time. The process of the present invention requires no chemical reagent additives prior to or during the heat treatment/calcination stage. The treated zircon is preferably subjected to a weak acid, preferably sulphuric acid, washing and attritioning step to remove the iron oxide coatings. It is believed that the heat treatment is effective to increase the surface exposure of iron hydroxides on the zircon surface, thereby enhancing the effectiveness of a subsequent leach.

According to the present invention, there is provided a process for the removal of iron oxide coatings from zirconiferous material which includes a first step of heat treating the zirconiferous material at a temperature, not greater than about 450° C. and preferably at least about 200° C., and for a period, preferably a maximum of about 30 minutes, sufficient to activate the coatings for enhanced ease of removal and thereafter subjecting the product of said first step to a leaching and/or attritioning treatment, preferably with an acid. The process may typically include the further step of separating the iron oxide coatings from the zirconiferous material.

The activation of the coatings may include increasing the surface exposure of iron hydroxides on the surface of the material.

If a whitened appearance is desirable, the preferred temperature range is 370° C. to 420° C. In general, the temperature is preferably at least about 325° C.

It is found that, while heat treatment at a temperature above 200° C. but below about 300° to 325° C. increases the surface exposure of the iron hydroxides in terms of a more continuous distribution of iron hydroxides on the zircon surface, possibly due to mobilisation or exclusion to the outer surface of the grains, better removal of the iron oxide coatings after the leaching step can be achieved if the heat treatment temperature is above about 300° C. to 325° C. This may be connected with the known observation that at a temperature of around 325° C. water of hydration is driven off, which increases the exposure of the iron hydroxide coatings and provides greater area for attack by reagents.

A heat treatment temperature above 450° C. is undesirable because, besides not achieving a greater level of coatings removal, the residual iron oxides on the zirconiferous material become more brightly coloured. Optimum results, in terms of a satisfactory reduction of iron oxide coatings to 0.07% or less by weight equivalent $Fe_2O_3$, minimal brightening of the residual iron oxides, and substantial whitening of the zircon, are achieved at a temperature in the range 370° to 420° C., for example in the region of 400° C.

DESCRIPTION OF THE PREFERRED EMBODIMENTS

Figure 1:
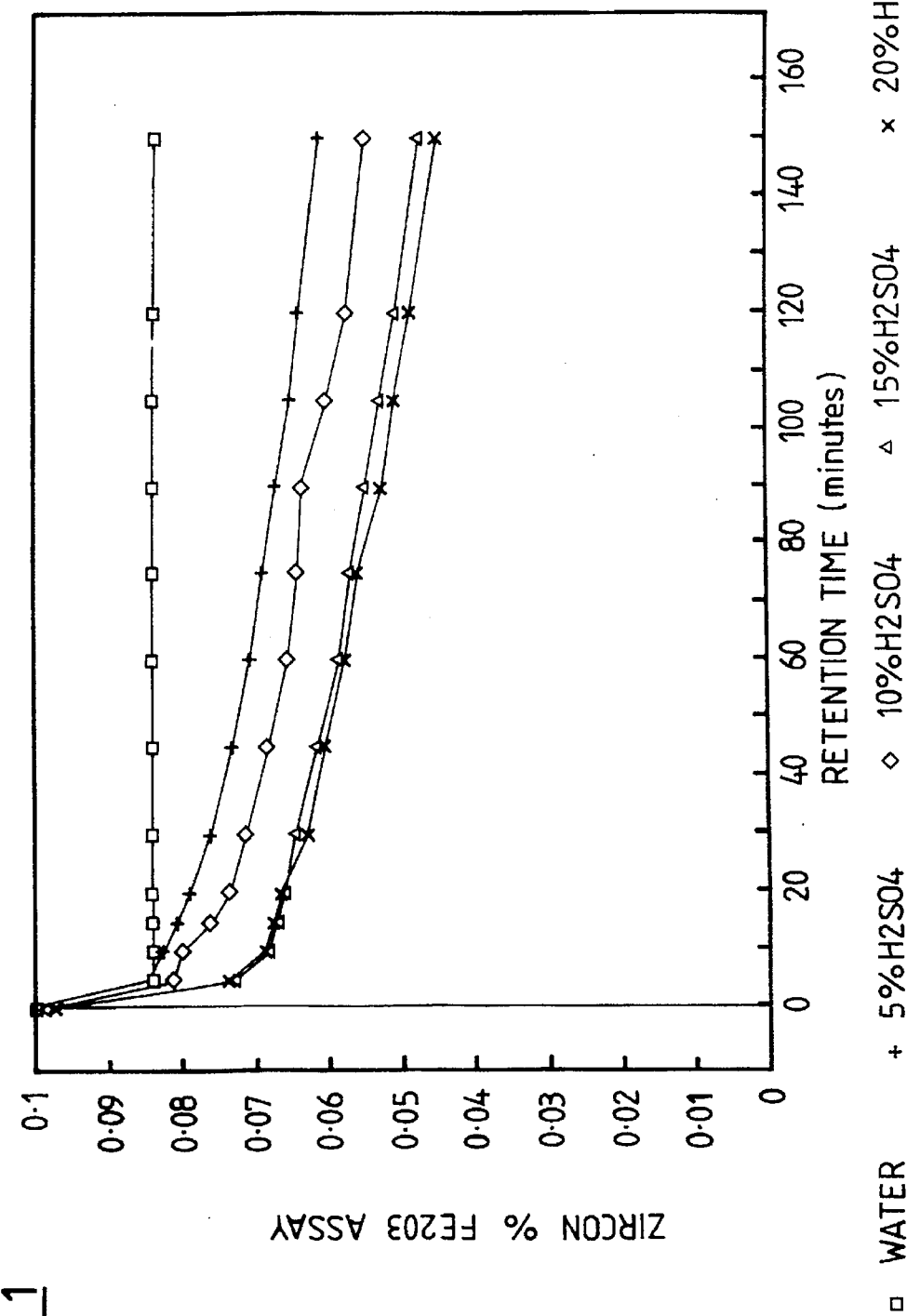
FIG. 1 is a graph illustrating the Zircon % $Fe_2O_3$ Assay versus the retention time for various acid treatments with no preheat.

The heat treatment step may be carried out by any known means such as in a rotary kiln or a fluid bed reactor and preferably using natural gas or a liquid fuel as the heat source.

The duration of the heat treatment is preferably for a maximum of about 30 minutes, most preferably 20 minutes or less. Above 20 minutes, and certainly after 30 minutes or more, the surface exposure of iron hydroxides is significantly diminished relative to the position at 20 minutes. The duration of the heat treatment is preferably at least 5 minutes: a satisfactory period appears to be 5 to 20 minutes; 10 minutes or less is usually sufficient.

The increased surface exposure of the iron hydroxides is thought to also arise in part from a more continuous distribution of iron hydroxides on the zircon surfaces after the heat treatment.

Observations utilising a variety of analytic techniques including surface analysis using X-ray photoelectron spectroscopy, diffuse reflectance Fourier transform infrared spectroscopy, optical microscopy, and chemical mapping of surface iron using scanning electro-microscopy, indicate that there is no significant change in the chemical form of the iron on heating up to at least 400° C. Results at higher temperatures suggest a phase change in the iron oxide/hydroxide at about 475° C., eg to a goethite ($\alpha$-FeOOH) or $Fe_2O_3$. This is consistent with the observed brightening of the residual oxide coatings mentioned previously.

Preferably, the hot calcined material is discharged directly into a slurry tank, eg a stainless steel tank, containing dilute acid. Any suitable acid may be used but it is preferably a weak or dilute acid. A mineral acid is however generally preferred and sulphuric acid is especially preferred, eg for economic and handling reasons. In the case of sulphuric acid, the strength is preferably between 1 and 25% w/w and more preferably between 2 and 10% w/w $H_2SO_4$. If the initial iron oxides content is above about 0.11% by weight equivalent $Fe_2O_3$, it is thought that the $H_2SO_4$ concentration is preferably at least 5% w/w to ensure a final iron oxides content clearly below 0.07%.

The acid-treated slurry may be fed to one or more attritioners to assist in the removal of the iron oxide coatings and, optionally, steam may be introduced to maintain and/or raise the attritioning temperature, eg at or to 80° C. to 85° C., in order to reduce the residence time. Typically, attritioning may be for a period of 25 minutes at 50% w/w solids concentration but may range between 10 minutes and 2 hours and between 20% and 80% w/w solids depending on the amount of iron oxide coating to be removed. Pumping practicalities may limit the solids content to below 60% w/w.

With a heat treatment temperature in the range 300° to 400° C., the heat contained by the zircon will normally be sufficient to maintain the recirculating dilute acid leach liquor at an optimum 80° to 85° C. Preheat temperatures less than 300° C. will normally result in leach temperatures less than 80° C. which then results in reduced rates of iron coating dissolution. This represents a further benefit in the heat treatment temperature being above about 300° C.

Separation of the iron oxide coatings from the zirconiferous material may be effected by any known means, eg hydrosizer separation or a solids washing device. The product may be finally dried by any known means, eg filtration followed by fluid bed drying.

The process preferably includes, prior to drying, a neutralisation step, eg treatment with lime, in order to provide zircon at a pH of about 7, required in ceramic-grade applications.

It will be understood that the heat treatment temperature and duration, the acid concentration and the attritioning conditions are independent variables and that the correct balance will depend on a variety of economic and practical factors.

One feature of the process herein disclosed is the use of a dilute or weak acid. Such acid (a) permits recycling of the acid in a technically—viable manner, eg without further significant dilution and (b) reduces costs at the neutralisation step.

Initial determinations, based on the examples which follow, suggest that both the capital investment and operating cost associated with practical implementation of the process of the invention in a zircon treatment plant are modest relative to known effective processes such as those described above.

EXAMPLE 1

Samples of commercially produced zircon, one originating from the Eneabba North orebody, the other from the Eneabba West orebody, both in Western Australia, were fed separately to a 2.0 meter long gas-fired rotary kiln at the rate of 10 kg per minute. The respective heating (calcination) times and solids discharge temperatures are shown in Table 1 below. 10 kg samples of the calcined products were slurried in 5% w/w sulphuric acid to give a 40% w/w solids density, heated to 80° C., vigorously agitated for 30 minutes at 85° C. to 90° C., thoroughly washed in water and finally dried. The figures in Table 1 show that the process will produce a ceramic grade zircon.

TABLE 1

|  | Eneabba North Zircon | Eneabba West Zircon |
| --- | --- | --- |
| Calcination time - minutes | 7 | 3.5 |
| Calcination discharge temperature - °C. | 400 | 375 |
| Zircon feed - % $Fe_2O_3$ | 0.13 | 0.12 |
| Zircon product - % $Fe_2O_3$ | 0.04 | 0.05 |

EXAMPLE 2

Five 2 kg samples of Eneabba North zircon, initially 0.099% $Fe_2O_3$, were variously subjected to different combinations of treatments. A first group of samples were not pre-heated but were directly leached and attritioned in respective sulphuric acid leach solutions of different strengths. Leaching was conducted in a 2.0 L round-bottom flask fitted with a lid and reflux condenser. Heating of the pulp was achieved using a heating mantel in conjunction with a thermostat controller. Agitation of the pulp was at a constant 700 rpm using a glass impeller (consisting of 85 mm diameter twin blades in opposing directions) fixed into an overhead drill press. The leach solution was added to the reaction vessel via a funnel and heated to 80° C. When temperature was reached the stirrer was started and the 2.0 kg sample of zircon (at a temperature of 80° to 90° C.) was added via funnel and the leach start-time recorded. Pulp temperature was checked regularly to ensure a constant 80° C. was maintained. At leach times of 5, 10, 15, 20, 30, 45, 60, 75, 90, 120 and 150 minutes, a 10 ml sample of each liquor was collected using a syringe (fitted with a millipore filter cap) for subsequent analysis of soluble Fe via AAS (Atomic Absorption Spectroscopy).

Another sample was subjected to water attrition without heat pre-treatment.

Further samples were respectfully subjected to the same leach/attritions as above but only after heat treatment. This involved roasting the zircon at 400° C. immediately prior to the leaching stage. Each sample to be roasted was placed in a stainless steel pot and then rotated for 40 minutes inside a Birlec furnace (preheated to 400° C.). A thermocouple located inside the pot allowed recording of the temperature profile of the zircon. Each sample was recorded as being held for 15 minutes at 400° C. At the conclusion of the roast the pot was removed from the furnace and the zircon allowed to cool to approximately 120° C. The zircon was taken from the pot and screened at 500 microns to remove any iron flaking originating from the stainless steel pot. When the zircon has cooled to 80° to 90° C. it was subject to the respective leach or water attritioning as for the other samples.

Figure 2:
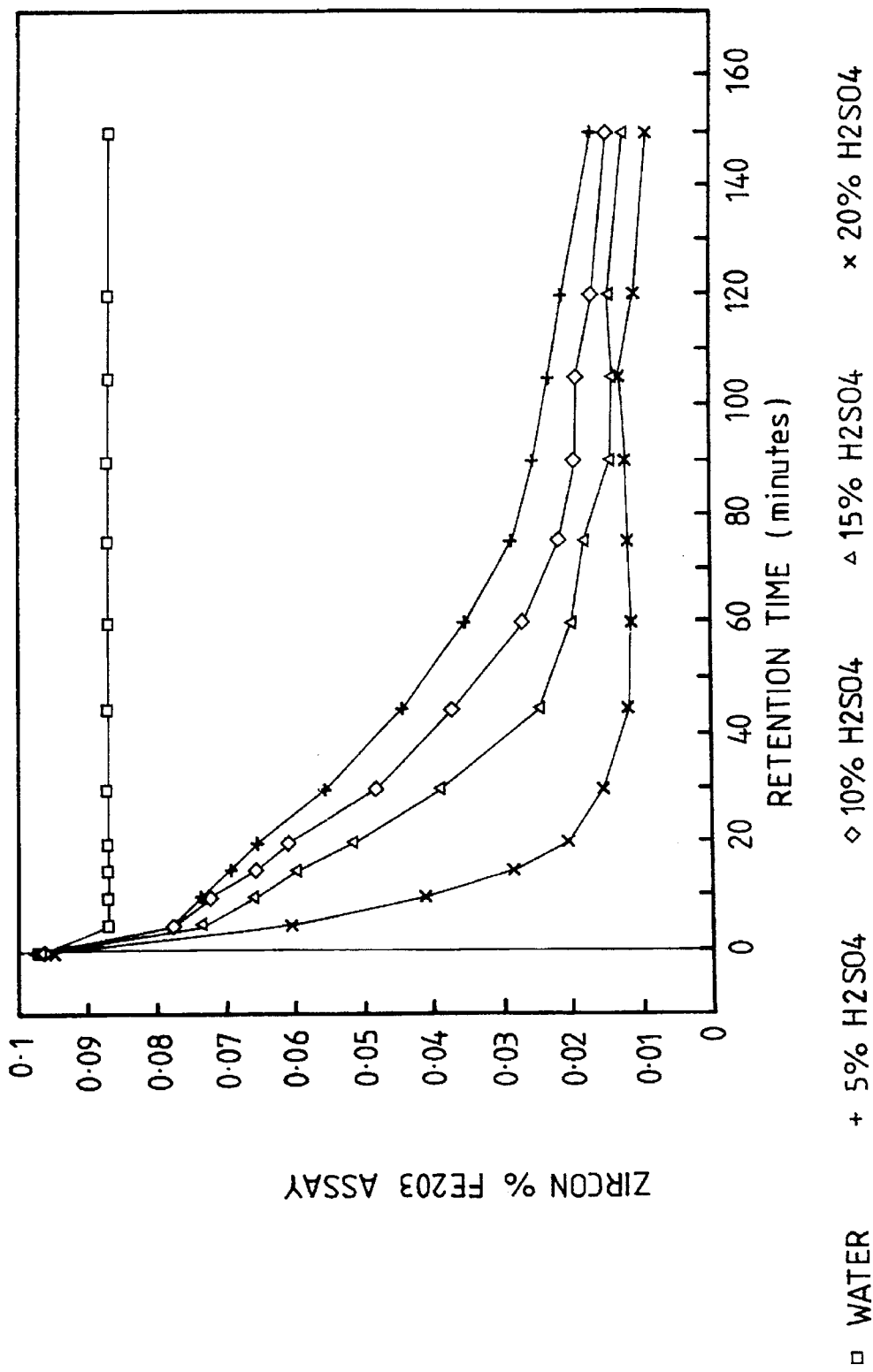
FIG. 2 graphically illustrates the Zircon % $Fe_2O_3$ Assay versus Retention time for various acid concentrations with a preheat.

The results of these experiments are depicted graphically in FIGS. 1 and 2.

It will be seen that ceramic grade zircon could be achieved from the 0.099% $Fe_2O_3$ feed zircon, but only after an extended acid treatment time of 2½ hours. A better grade zircon could be achieved in a much shorter time by adding the heating pre-treatment before the acid treatment.

EXAMPLE 3

140 gm samples of Eneabba North zircon were subjected to a heat treatment in a bench scale muffle furnace at varying temperatures for 30 minutes in the range 300° C. to 500° C. and then subjected to a dilute 10% w/w hydrochloric acid leach for 10 minutes with vigorous agitation. The results are set out in Table 2.

TABLE 2

| TEST | ASSAY % $Fe_2O_3$ |
| --- | --- |
| Untreated zircon | 0.104 |
| No preheat, dilute acid leach only at 80° C., 10 minutes | 0.080 |
| Preheat 300° C., 30 min then dilute acid leach at 80° C., 10 min | 0.023 |
| Preheat 400° C., 30 min then dilute acid leach at 80° C., 10 min | 0.019 |
| Preheat 500° C., 30 min then dilute acid leach at 80° C., 10 min | 0.025 |

EXAMPLE 4

The effect of residence time and temperature during the heat treatment was investigated by preparing two series of samples in a pre-calibrated furnace and then analysing the variation in iron oxides exposure on the surface by X-ray photoelectron spectroscopy (XPS) and analytical scanning electron microscope (SEM).

The furnace temperature was independently measured with a thermocouple to check the actual temperature to which the samples were subjected.

In the first series heat treatment times of 5, 10, 20, 50, 150 min at 400° C. were respectively applied to the samples. The samples were immediately analysed by XPS and retained for a latter examination by SEM. They were stored in a closed tube for the SEM examination. Immediate analysis by XPS was necessary to attempt to retain the chemical states induced by the heat treatment. The SEM analysis was directed at establishing the changes in the distribution, crystallinity and structure of the layers. Rehydration was avoided by the closed vessel storage.

The second series were prepared by heating for 10 min at 150°, 250°, 325°, 400°, 550° and 650° C. The same procedures for XPS and SEM examination were followed.

Figure 3:
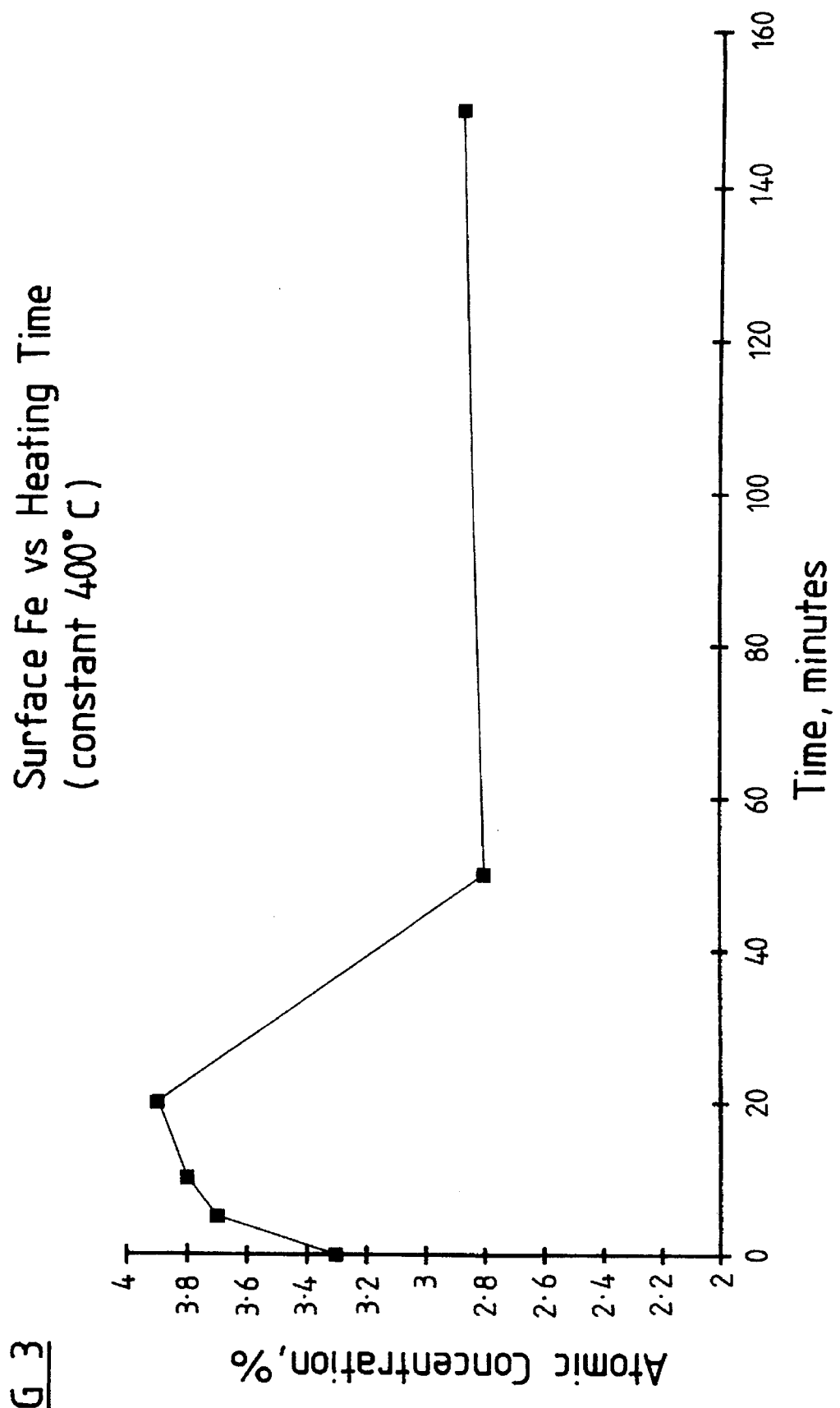
FIG. 3 graphically illustrates the concentration of Fe at the surface versus the heating time.

The XPS technique analyses depths of 3 to 5 nm to give surface composition (in atomic %) and identification of the chemical states (ie oxidation state, valency, compound type) of all elements detected in these layers. The variation of the iron exposure with heat treatment time at 400° C. is presented in graphical form in FIG. 3. There is a considerable increase in iron exposure between the initial (unheated) sample and 5 min heated sample. The maximum exposure of iron is found after 20 min at 400° C. Thereafter, iron exposure is considerably reduced at 50 and 150 min.

Figure 4:
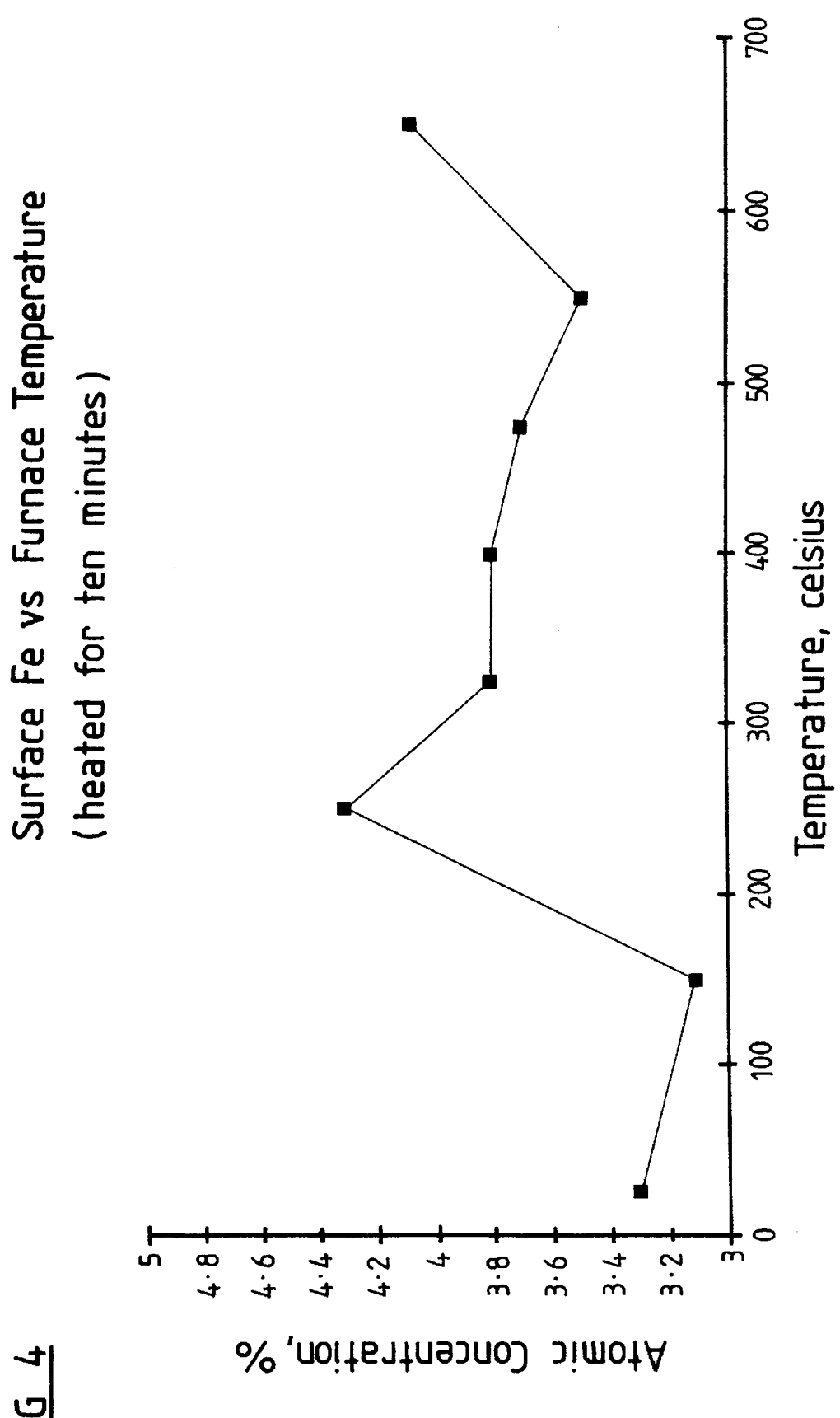
FIG. 4 graphically illustrates the concentration of Fe at the surface versus the temperature (Celsius) for ten minutes of heating.

FIG. 4 presents iron exposure as a function of heat treatment temperature. The exposure generally increases between room temperature and 400° C., reaching a maximum at this temperature without further significant increase across 400° to 650° C. heat treated samples.

The results suggest that the maximum increase in iron exposure is found in the region of 400° C. for quite short periods (ie 5 to 10 min) of heating.

The related obtained spectra also demonstrated that the chemical form of the iron did not appear to change significantly from 5 to 150 min of pre-heating at 400° C., but there was some indication in the spectra that a change in the chemical form of the iron takes place at temperatures above 400° C. The width of the broad spectra at low temperatures, attributable to $FeOH_3$, is systematically reduced and there is a shift to higher binding energy suggesting that the chemical form is becoming more like goethite ($\alpha FeOOH$) or $Fe_2O_3$. These results indicate that a phase change in the iron oxide/hydroxide takes place above 475° C. but that, at 400° C., the hydroxide structure is retained.

Throughout this specification and the claims which follow, unless the context requires otherwise, the word "comprise", or variations such as "comprises" or "comprising", will be understood to imply the inclusion of a stated integer or group of integers but not the exclusion of any other integer or group of integers.

We claim:

1. A process for the removal of iron oxide coatings from zirconiferous material which includes a first step of heating the zirconiferous material at a temperature not less than about 200° C. and not greater than about 450° C. and for a period of time sufficient to activate the coatings for enhanced ease of removal and thereafter subjecting the product of said first step to a second step comprising at least one treatment selected from the group consisting of leaching said product and attritioning said product and thereafter subjecting the product of said second step to a third step wherein an iron-containing and a zirconium-containing phase are separated.

2. A process according to claim 1 wherein said activation of the coatings includes increasing the surface exposure of iron hydroxides on the surface of said material.

3. A process according to claim 1 wherein said second step comprises leaching said product with an acid.

4. A process according to claim 1 wherein the temperature is at least about 325° C.

5. A process according to claim 4 wherein said temperature is in the range 370° C. to 420° C.

6. A process according to claim 5 wherein said period of time is no more than about 30 minutes.

7. A process according to claim 6 wherein said period of time is in the range 5 to 20 minutes.

8. A process according to claim 1 wherein said leaching is with a mineral acid.

9. A process according to claim 8 wherein said mineral acid is sulphuric acid.

10. A process according to claim 9 wherein the strength of the sulphuric acid is in the range 2 to 10% w/w.

11. A process according to claim 1 wherein said leaching includes discharging said product directly into a slurry tank containing acid.

12. A process according to claim 11 wherein the leaching further includes attritioning the product of claim 11 in one or more attritioners.

13. A process according to claim 12 further including introducing steam to said one or more attritioners to maintain and/or raise the attritioning temperature.

14. A process according to claim 12 wherein attritioning is for a period of time in the range 10 minutes to 2 hours at a solids concentration in the range 20% and 80% w/w solids.

15. A process according to claim 8 further including a neutralisation step after said leaching to netralise any residual mineral acid.

16. A process according to claim 1 wherein the zirconiferous material comprises zircon.

17. A process according to claim 1 wherein said period of time is no more than about 30 minutes.

18. A process according to claim 17 wherein said period of time is in the range 5 to 20 minutes.

19. A process according to claim 6 wherein said leaching is with a mineral acid.

20. A process according to claim 19 wherein said mineral acid is sulphuric acid.

21. A process according to claim 19 wherein the leaching further includes feeding the acid-treated product to one or more attritioners.

22. A process according to claim 19 further including a neutralisation step after said leaching to neutralise any residual mineral acid.

23. A process according to claim 19 wherein the zirconiferous material comprises zircon.

24. A process as claimed in claim 12, further including introducing steam to said one or more attritioners to maintain and/or raise the attritioning temperature to 80° to 85° C.

* * * * *

UNITED STATES PATENT AND TRADEMARK OFFICE
CERTIFICATE OF CORRECTION

PATENT NO. : 5,637,281
DATED : June 10, 1997
INVENTOR(S) : Mayes, et al.

It is certified that error appears in the above-indentified patent and that said Letters Patent is hereby corrected as shown below:

Title page,
item [54] (in the Title) and in Col. 1, line 1

"PROCESS FOR THE REMOVAL OF FROM OXIDE COATINGS IRON ZIRCONIFEROUS MATERIAL"

should be:

--PROCESS FOR THE REMOVAL OF IRON OXIDE COATINGS FROM ZIRCONIFEROUS MATERIAL--

Col. 5, line 40          "each" should be --leach--.

Col. 5, line 60          "has" should be --had--.

Signed and Sealed this

Eighteenth Day of November 1997

Attest:

BRUCE LEHMAN

Attesting Officer

Commissioner of Patents and Trademarks